United States Patent [19]
Krone et al.

[11] 4,125,987
[45] Nov. 21, 1978

[54] ROW CROP HARVESTER

[75] Inventors: Bernard Krone, Spelle; Wilhelm Ahler, Stadtlohn, both of Germany

[73] Assignee: Maschinenfabriken Bernard Krone GmbH, Spelle, Germany

[21] Appl. No.: 728,772

[22] Filed: Oct. 1, 1976

[30] Foreign Application Priority Data

Oct. 3, 1975 [DE] Fed. Rep. of Germany ....... 2544200

[51] Int. Cl.$^2$ ............................................ A01D 45/02
[52] U.S. Cl. ...................................... 56/13.3; 56/13.9
[58] Field of Search .............. 56/503, 60, 13.3, 13.4, 56/12.8, 13.5, 13.6, 13.7, 13.8, 13.9, 504

[56] References Cited

U.S. PATENT DOCUMENTS

| | | | |
|---|---|---|---|
| 2,657,513 | 11/1953 | Martin | 56/13.4 |
| 3,583,134 | 6/1971 | Kemper et al. | 56/13.3 |
| 3,766,723 | 10/1973 | Maier et al. | 56/13.3 |
| 3,771,300 | 11/1973 | Jourdan | 56/119 |

*Primary Examiner*—Russell R. Kinsey

[57] ABSTRACT

A machine for cutting and harvesting of crops having stalks which is pulled by a tractor in a direction of travel. The machine includes a guide casing which has vertical cylindrical wall means. A vertical drum with gripper teeth is rotatably mounted on the guide casing and pulls the stalks of the crops into a pulling passage defined by the cylindrical surface of the drum and the vertical cylindrical wall means. A feed trough merges with the vertical wall means which extend from a 3-o'clock to an 8-o'clock position of the drum. A chaff blower having a pair of feed rollers is mounted at the outlet of the feed trough. The stalks of the crop are seized by the gripper teeth of the drum and transported through the pulling in passage where they are cut by cutting means and then are transported to the feed trough while assuming an increasingly rearwardly inclined position with respect to the direction of travel.

8 Claims, 2 Drawing Figures

ROW CROP HARVESTER

BACKGROUND OF THE INVENTION

The invention pertains to a machine for cutting, and harvesting of corn and similar crops having stalks.

There are already known a large number of constructions which perform a similar function. In general, these constructions are connected to a tractor to be pulled or pushed by the latter while the unit acts on the crops in the ground to harvest the crops. Such arrangements have also generally a mechanism which pulls in the stalks towards a stalk cutting device and thereafter transports the chopped-up stalks to a chaff blower arranged downstream from the stalk cutting mechanism. Such an arrangement of the prior art, generally includes a pair of transporting rollers arranged upstream from the blowing device for transporting the cut stalks of the crop thereto.

Such known machines of the prior art are generally relatively large and complex. Furthermore, these machines are very heavy and have, relative to the tractor, an auxiliary support structure, which supports a substantial lateral loading. Such constructions of the prior art therefore require lateral supports and/or heavy duty pulling tractors. The principal reason for such a large and complex construction resides in that the arrangement which pulls the stalks towards the cutting mechanism and thereafter transports the cut stalks to the chaff blower, must be of a very heavy construction. The aforedescribed mechanisms will hereafter be referred to as the pulling in and guiding arrangement for the crop. Frequently, it is not economically feasable or rewarding for the smaller farms to purchase such heavy and costly equipment. The heretofore known standard pulling in and guiding means generally comprise pairs of feed screws (see for example U.S. Pat. No. 3,583,134) or chains which extend bilaterally with respect to the mowing direction. Such arrangements are complex and require synchronous driving means. In view of the fact that the pulling in and guiding means of such known harvesting machines are very large, complex and heavy, these machine only are used to harvest large acreages of corn or similar stalk-like crops.

However, small farms increase constantly in number in many parts of the world in view of economic conditions. Such small farms require only small daily harvesting of crops for feeding cattle, for example, harvesting of corn which is freshly fed, without silage, daily to cattle. Such requirement is particularly frequent when the hay harvest is poor and when there is not sufficient daily fresh fodder available.

SUMMARY OF THE INVENTION

It is a general object of this invention to provide a machine for cutting and of corn and the like stalk-like crops which meets the requirement of the small farmer. The machine of the invention is light, small and compactly constructed. The pulling-in and guiding means of the machine are simple and not subject to malfunctioning. The machine is therefore substantially less costly to manufacture and has a much lower price than the heretofor known machines of this type.

The pulling-in and guiding means of the machine of the invention include a drum which rotates clockwise with respect to the direction of travel of the device. This drum has griping, respectively entraining means at its periphery which coact with a guide casing or surface that extends along the periphery of the drum between its 3-o'clock position and its 8-o'clock position. The stalks of the crop are, first of all, moved past the cutting mechanism, which is arranged in the region of the guide casing, and are thereafter moved towards the downwardly inclined feed trough while assuming a progressively inclined attitude with respect to the ground. The feed trough extends substantially tangentially with respect to the drum and communicates at its lower end with the chopped crop blowing device and the horizontal feed rollers which coact with the blowing device.

The arrangement of the invention is therefore very small, light and simple and satisfactorily performs the cutting of corn or similar crops. This is due to the fact that the pulling-in and guiding arrangement comprises only one single movable part, namely the aforementioned drum, which coacts with its guide sheathing or casing. The machine is substantially smaller in a lateral direction with respect to the travel direction than the prior art machines, and therefore has a much smaller lateral extension with respect to the pulling tractor as the machines of the prior art. This is so, because for practical purposes only the pulling-in and guiding arrangement, which is formed primarily by the drum and appurtenant guide casing, extends laterally beyond the width of the pulling tractor. The center of gravity of the arrangement falls within the periphery of the tractor and it is therefore not necessary to have a lateral support for the arrangement of this invention.

In view of the relatively very simple construction of the pulling-in and guiding arrangement, the arrangement in accordance with the invention constitutes a harvesting machine which is relatively very inexpensive and can be handled in a simple manner in particular for the daily harvesting of fresh fodder.

A further, particularly advantageous feature of the machine of this invention resides in that the feed trough has its principal axis parallel to the direction of travel of the machine. The blowing device for the chopped stalks together with the feed rollers is mounted transversely with respect to the direction of travel. Another feature of the arrangement of the invention resides in that the blowing device and pair of feed rollers extend along a vertical plane, the extension of which, transversely cuts through the drum relative to the direction of travel of the device, or is tangential thereto.

Instead of a pair of feed rollers, a single feed roller may coact with the blowing device of the invention.

The arrangement of this invention is very compact and provides for a very advantageous flow of chopped stalks, thus the stalks are pulled-in while in an erect position and are cut in this position. The cut stalks are then fed, with the cut end leading, in a direction opposite of the direction of the travel of the device, into the blowing device, whereby they are slowly moved from their vertical position into a position in which they incline rearwardly so that the cut stalks do at no time come in contact with the not-yet cut stalks, but are disposed in the free space which extends over and behind the cutting mechanism.

BRIEF DESCRIPTION OF THE DRAWING

The invention will be described in further detail in the following description taken in conjunction with the appended drawing, in which.

DESCRIPTION OF PREFERRED EMBODIMENT

Figure 1:
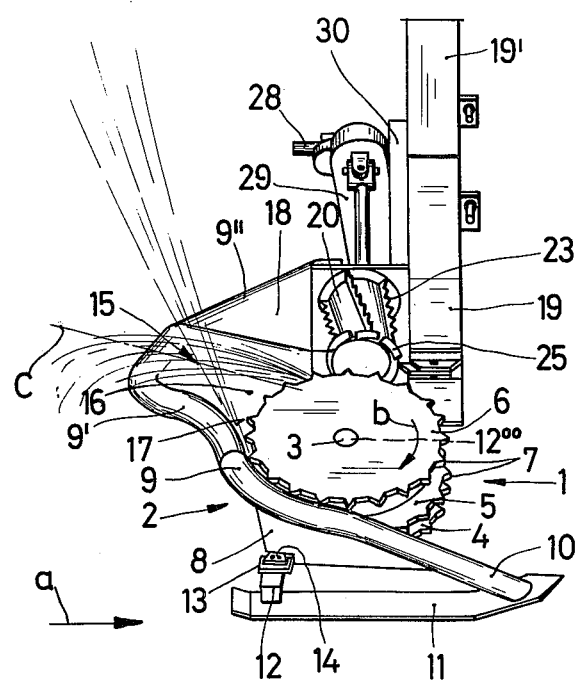
FIG. 1 is a side view inclined from above, in perspective, of the arrangement of the invention.

Referring now to FIG. 1, there is illustrated therein primarily the pulling-in and guiding arrangement of the machine of the invention. The arrangement is pulled by means of a tractor 27, illustrated in dashed lines in FIG. 2, which pulls the arrangement in the direction of the arrow "a". The pulling-in and guiding arrangement of the harvesting and mowing machine of the arrangement, includes a drum 1 which rotates clockwise as indicated by the arrow "b" about a substantially vertical axis (see FIG. 2). The drum 1 is provided on its cylindrical periphery with grippers or teeth 7. The pulling-in and guiding arrangement further includes a guide casing 2 which extends between the 3-o'clock position and the 8-o'clock position of the drum 1. Thus the guide casing 2 extends rearwardly and sidewardly with respect to the drum 1. The drum 1 is mounted on a vertical rotatable shaft 3 and consists of three equally large and coaxial chain wheels 4, 5, 6 which are mounted on the shaft 3. The peripheral teeth 7 of the chain wheels 4, 5, 6 constitute the grippers or entraining means of the arrangement. As can be noted particularly from FIG. 1, the two lower chain wheels 4, 5 are mounted on the shaft 3 only at a relatively small distance from each other, whereas the upper chain wheel 6 is mounted on the shaft 3 at a relatively larger axial distance relative to the chain wheel 5. The stalks of the crop are therefore grasped at a low point, that is a small distance from the ground, as well as at a considerably higher distance from the ground, in order to avoid an excessive bending of the the stalks while they are being pulled in by the pulling-in and guiding arrangement of the device.

The guide casing 2 for the drum 1 includes a rigid, partially cylindrical wall portion 8, the upper edge of which is formed by a pipe or bulge-like member 9. The edge pipe 9 of the guide casing 2 extends along the horizontal plane defined by the upper chain wheel 6, at a distance from the periphery of the chain wheel 6, from the 3-o'clock position to the 8-o'clock position while an extension 10 thereof extends forwardly and downwardly to a plane below the lower end of the drum 1 so as to form a stalk or leaf-lifting means for the arrangement of the invention. The leaf-lifting means 10 are connected at its forward end, at a plane below the drum 1, with a side skid 11 which extends tangentially forwardly with respect to the drum 1 and which constitutes the lateral outer limit of the arrangement of the invention. The skid 11 is, during travel of the arrangement, disposed slightly above the ground surface. This skid 11 is instrumental in preventing a lifting or excessive swaying of the arrangement when the tractor travels over humps or furrows and prevents the contacting of the remainder of the arrangement with the ground as the tractor travels over such uneven ground surfaces. The skid 11 is supported at its rear by the lower edge of the partially cylindrical wall 8 of the guide casing 2. This support takes the form of a bracket 12, which is connected, on the one hand, to the skid 11 and, on the other hand, to the cylindrical wall 8. The bracket 12 simultaneously forms a support 13 for the cutting tool or knife. This cutting tool or knife takes the form of a rigid exchangeable knife 14 which is mounted approximately at the 4-o'clock position of the drum periphery. The knife 14 extends between the lower chain wheels 4 and 5 of the drum 1. Such an arrangement provides for a clean cut of the stalk which is moved into the cutting region of the knife 14 by the teeth 7 which grasp the stalk and move it rearwardly towards the knife 14. It should be noted that the cutting means represented by the rigid knife 14 can be replaced by a freely rotatable cutting disc (not illustrated) mounted approximately in the same location as the cutting knife 14.

In the rear region of the periphery of the rotating drum 1, approximately at the 7-o'clock position thereof, the guide casing 2 continues as feed trough 15. The guide casing 2 is connected to the bottom 16 of the feed trough 15 by means of a transfer member 17, which is connected, on the one hand, to the partially cylindrical wall 8 of the guide casing 2 and, on the other hand, to the bottom 16 of the feed trough 15. The transfer member 17 is arcuate, vaulted in shape and effects a smooth merging of the cylindrical wall 8 with the bottom 16. In a similar manner, the edge pipe 9 of the guide casing 2 continues rearwardly and downwardly in the form of an edge pipe member 9' until it smoothly merges with the feed trough 15. The edge pipe 9' then continues upwardly in a direction parallel to the axis $c$ of the feed trough 15 in the form of an edge pipe 9". The edge pipe 9" forms the upper edge of a vertical wall 18, which constitutes the lateral limit of the feed trough. The other lateral limit of the feed trough 15 is represented by the drum 1 itself, as can be noted from FIG. 2.

The bottom 16 of the feed trough 15 is inclined obliquely downwardly in the direction of its principal axis. The lower forward end of the trough 15 terminates at the chopped stalks chaff blower 19. This mechanism cooperates with the feed rollers 20, 21 which are mounted immediately in front of the inlet of the chaff blower 19. The lower feed roller 21 is mounted by means of a shaft 22 so that its periphery coincides approximately with the plane of the bottom 16 of the trough 15. The feed roller 21 has a smooth surface, whereas the upper feed roller 20 has gripper teeth 20' mounted along its periphery. The peripheries of the feed rollers 20 and 21 define a feed slit 23 therebetween. The feed roller 20 is mounted on a shaft 24, which is connected by means of a universal joint 24' to a drive mechanism 29. In view of the universal joint 24', the feed roller 20 is freely rotatably mounted and movable in the direction of the arrow "d" (see FIG. 2). The upper feed roller 20 therefore can move in opposition to its dead weight (or possibly by means of a spring, which is not illustrated) upwardly so as to enlarge the feed slit 23. Thus the feed slit 23 adjusts itself automatically to the mass of cut crop material that is fed through feed trough 15.

The direction assumed by the main axis "c" of the feed trough 15, that is the attitude assumed by the arrangement of the invention, can be selected at will. Thus, it is possible to have the feed trough 15, with its main axis "c" arranged so that it is disposed transversely with respect to the direction of travel "a" of the arrangement. If this is the case, the chaff blower 19 together with the appurtenant feed rollers 20, 21 are mounted in a vertical plane (see FIG. 1) which extends parallel to the direction of travel "a". It is, however, also possible to arrange the feed trough 15 with its principal axis "c" at an angle of, for example, 45° with respect to the direction of travel "a". In such a case, the chaff blower 19 with the feed rollers 20, 21 fall into a vertical plane which intersects a vertical plane passing through the drum 1 and extending into the direction of travel at a distance from the drum 1.

The preferred embodiment, which is illustrated in the drawing, constitutes an arrangement wherein the feed trough 15 with its principal axis "c" extends in the direction of travel "a" of the arrangement and wherein the forward end, that is the forward border of the feed trough 15 is formed by the pair of rollers 20, 21 and the chaff blower 19. As can be further noted from FIG. 1, the preferred arrangement has the chaff blower and the pair of feed rollers 20, 21 fall into a vertical plane the prolongation of which intersects the horizontal plane of rotation of the drum 1 in the region between the 9-o'clock and 3-o'clock position, that is in the forward region with respect to the direction of travel, transverse with respect to the horizontal plane of rotation, or at least tangentially with respect to the plane of rotation (not illustrated). As can be noted from FIG. 1, the vertical or nearly vertical axis of rotation of the drum 1, and the transverse axes of rotation of the feed rollers 20, 21 fall almost in the same vertical plane.

The face of the upper feed roller 20 which confronts the periphery of the drum 1 is provided at its outer periphery with a plurality of free-arcuate cutting knives 25. These knives 25 serve to avoid a clogging of the arrangement of the invention when a large number of stalks are accumulated in the feed trough 15 and are urged past the pair of rollers 20, 21 by the gripper teeth 7 of the drum 1. In addition thereto, it is advantageous to provide a plurality of skimmer or stripper blades in the region between the periphery of the drum 1 and the pair of feed rollers 20, 21. These stripper blades are preferably mounted between the chain wheels 4, 5, 6 (not illustrated).

The drum 1 with the guide casing 2 and the feed trough 15 connected thereto, as well as the chaff blower 19 with the pair of feed rollers 20, 21 mounted in front of it form jointly a unit which can be connected by means of a block 26 to the three-point-hydraulic-hitch of a tractor or similar vehicle. In this manner, the arrangement of the invention forms a unit that extends transversely with respect to the direction of travel of the tractor and extends with respect to a horizontal plane obliquely outwardly and downwardly. As can be noted in particular from FIG. 2, the arrangement of the invention projects beyond the transverse limits of the tractor, that is beyond the rear wheel 27 thereof, only by the lateral extent of the drum 1 and the guide casing 2, which form jointly a pulling-in and guiding means. The center of gravity of the invention, which is indicated by the dashed line S falls therefor within the trace made by the tractor as it travels on the ground, so that the load on the three-point-hydraulic-hitch of the tractor is relatively small and a lateral support on the ground for the arrangement of the invention is not required.

The arrangement of the invention operates as follows:

The tractor pulls the arrangement of the invention in the direction of the arrow "a". The stalks which arrive in front of the drum 1, that is in the peripheral region of the drum 1 falling between the 11-o'clock and 3-o'clock position, are gripped and pulled in by the teeth 7 of the drum 1 in the slit between the drum 1 and guide casing 2. By virtue of the coaction of the drum 1 and the guide casing 2, the stalks are moved in a substantially erect position towards the mowing knife 14 which cuts the stalks from their rooted portion. The cut stalks are thereafter moved again by the coaction of the drum 1 and the guide casing 2 transversely of the direction of travel "a" into the feed trough 15. The vaulted or arcuate transfer member 17 of the partially cylindrical wall 8 of the guide casing 2 and the edge part 9', extending outwardly and rearwardly jointly with the guide pipe 9, cause the stalks to assume an increasingly rearwardly inclined position into the free space behind the machine, as illustrated in FIG. 1. The stalks thus arrive in an inclined position in the feed trough 15 so that the cut ends of the stalks move into the region of the feed rollers 20, 21. The inclination of the feed trough 15 in the direction along the main axis "c" effects jointly with the attitude assumed by the stalks being forwarded by the drum, that these stalks arrive with their cut ends at the feed rollers. The attitude assumed by the stalks as they are being processed by the arrangement of the invention is shown in thin dashed lines in FIG. 1.

Figure 2:
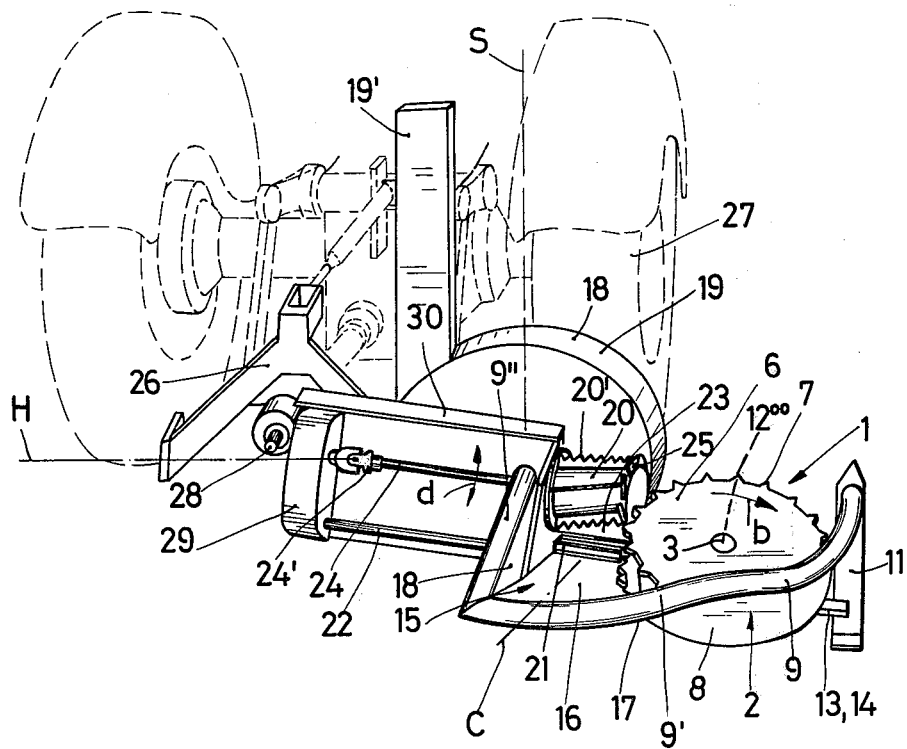
FIG. 2 is a rear view of the arrangement of the invention in perspective, also looking downwardly from above.

As can be noted from FIG. 2, the arrangement of the invention assumes a slightly inclined position with respect to the horizontal plane "H". A slightly inclined attitude is also assumed by the drum 1 and the guide casing 2, as shown in FIG. 2. The aforedescribed inclined position of the mowing tool assures that the cutting of the stalks occurs relatively close to the ground surface, whereas the cut stalks are thereafter guidingly moved progressively upwardly to such an extent as is necessary to insure a proper functioning for the chaff blower 19 and simultaneously insure that the necessary distance between the chaff blower and the ground is maintained. It is preferred that the bottom 16 of the feed trough 15 is disposed along a plane which, as viewed from behind (see FIG. 2), is parallel to the horizontal line "H", that is, forms an angle with respect to the main axis "H" of the machine which extends upwardly and downwardly. In this manner it is avoided that the cut stalks which are moved into the feed trough 15 are shifted towards the drum 1 as the arrangement is towed by the tractor. This feature can even be further improved in that the bottom 16 of the feed trough 15 has, in addition to the continuously inclined attitude along its main axis "c" which is inclined downwardly and forwardly towards the feed rollers 20, 21, also has an attitude which actually is inclined towards the lateral side wall 18 so that the stalks in the feed trough 15 have a continuous tendency to move away from the drum 1 towards the side wall 18 of the feed trough 15.

The cut stalks of the mowed crop which are moved into the feed trough 15 are thereafter gripped by the feed rollers 20, 21 and are moved with their cut ends leading the way, into the chaff blower 19. In view of the fact that the upper feed roller 20 is movably mounted by virtue of the universal joint 24', as has been described herein before, there is insured that the correct amount of cut stalks are being transported to the feed trough 15 and are pushed into the chaff blower 19. Thereby a clogging of the feed slit 23 is avoided.

The chaff blower 19 transports the cut crop material via a vertical upwardly extending blowing duct 19' upwardly and blows it into a wagon disposed behind the arrangement of the invention and also being towed by the tractor. The duct 19' thus transports the cut crop via a non-illustrated standard rearwardly extending arcuate portion into the towed wagon. In view of the fact that the duct 19' of the chaff blower 19 falls within the lateral peripheries of the tractor, that is near its middle axis, it is insured that the storage space of the towed wagon is filled properly and uniformly because the distance between the outlet end of the rearwardly extending duct 19' and the towed wagon is considerably shortened.

It should be noted that the drive of all the members of the arrangement of the invention is carried out in the standard manner by means of a drive shaft 28 of the tractor. Synchronous drives for the shafts 22, 24 of the feed rollers 20, 21 is carried out by means of the aforementioned drive mechanism 29. The drive for the chaff blower 19 is carried out by a chain drive mechanism indicated with reference numeral 30. The drive for the shaft 3 of the drum 1 is carried out by an extension of the drive shaft 22 which drives the lower feed roller 21 by means of an intermediate standard angular gear drive.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A machine for cutting and chopping of crops with stalks which is adapted to be pulled in a direction of travel by a tractor or the like over the ground on which the crop with stalks to be harvested is located, comprising in combination, a guide casing having vertical wall means;

a cylindrical drum rotatably mounted on the guide casing about a substantially vertical axis, said drum having gripper teeth extending from its periphery; the direction of travel of the drum corresponding to the twelve o'clock position on the drum, a first portion of said vertical wall means extending substantially parallel to the cylindrical surface of the drum at a distance therefrom from its 3-o'clock position to its 8-o'clock position and defining therewith a pulling in passage for the crop to be harvested, a second portion of said vertical wall means merging with said first portion and forming a feed trough which extends substantially tangentially with respect to said drum;

a chaff blower having an inlet is operatively mounted contiguous to said feed trough;

a pair of feed rollers are operatively mounted on said guide casing immediately upstream of said inlet of said chaff blower;

cutting means are connected to said first portion of said vertical wall means and extend into said pulling in passage;

whereby the stalks of the crop are adapted to be seized by the gripper teeth of the drum and transported into said pulling in passage in said cutting means where the stalks are cut off and thereafter the cut stalks are transported to the feed trough while assuming a progressive rearwardly inclined attitude with respect to the direction of travel of the machine.

2. The machine for cutting and chopping of crops with stalks as set forth in claim 1, wherein said feed trough has a principal axis which extends parallel to the direction of travel, and said chaff blower and pair of feed rollers extend along a first plane which is transverse to the direction of travel.

3. The machine for cutting and chopping of crops with stalks as set forth in claim 2, wherein the upper end of said vertical drum defines a second substantially horizontal plane, said first plane intersecting said second plane.

4. The machine for cutting and chopping of crops with stalks as set forth in claim 2, wherein said first plane is tangential with respect to said drum.

5. The machine for cutting and chopping of crops with stalks as set forth in claim 3, wherein the upper one of said pair of feed rollers is vertically movably mounted on a shaft extending transversely relative to the direction of travel relative to the lower one of said pair of feed rollers.

6. The machine for cutting and chopping of crops with stalks as set forth in claim 5, including drive means operatively connected to said chaff blower, pair of feed rollers and drum, a frame supporting said guide casing, chaff blower, pair of feed rollers and drive means, said frame being adapted to be drivingly connected to the three point hydraulic hitch of a tractor pulling the machine, said frame extending transversely downwardly relative to said second plane and transversely relative to the direction of travel.

7. The machine for cutting and chopping of crops with stalks as set forth in claim 6, wherein said drum is composed of a plurality of chain wheels, each one of which has said gripper teeth extending from its circumferential periphery.

8. The machine for cutting and chopping of chops with stalks as set forth in claim 7, wherein said cutting means include a knife which extends into said pulling in passage between the two lowermost chain wheels of said plurality of chain wheels of said drum.

* * * * *